US011052813B1

(12) United States Patent
Szeglin

(10) Patent No.: US 11,052,813 B1
(45) Date of Patent: Jul. 6, 2021

(54) CARGO LASHING FITTING

(71) Applicant: Peck & Hale, L.L.C., West Sayville, NY (US)

(72) Inventor: John L. Szeglin, Sayville, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 267 days.

(21) Appl. No.: 16/253,413

(22) Filed: Jan. 22, 2019

Related U.S. Application Data

(60) Provisional application No. 62/633,427, filed on Feb. 21, 2018.

(51) Int. Cl.
*B60P 7/08* (2006.01)
*B62D 65/02* (2006.01)

(52) U.S. Cl.
CPC ............ *B60P 7/0807* (2013.01); *B62D 65/02* (2013.01)

(58) Field of Classification Search
CPC ..... B61D 45/001; B61D 45/00; B60P 7/0807; E04B 1/34347; B62D 65/02
USPC .............. 410/112; 248/499, 500, 503, 205.1; D8/356, 354, 349, 367; 114/218
See application file for complete search history.

(56) References Cited

U.S. PATENT DOCUMENTS

| | | |
|---|---|---|
| 2,843,060 A | 7/1958 | Sladek |
| 2,952,946 A | 9/1960 | Lucas |
| 2,962,245 A | 11/1960 | Molzan |
| 3,233,319 A | 2/1966 | Jensen |
| 3,442,224 A * | 5/1969 | Rutkoski ................ B61D 17/10 410/113 |
| 3,556,457 A | 1/1971 | Patnaude |
| 3,647,172 A | 3/1972 | van der Molen |
| 3,776,169 A | 12/1973 | Strecker |
| 3,860,209 A | 1/1975 | Strecker |
| 3,888,190 A | 6/1975 | Bigge |
| 3,927,623 A | 12/1975 | Caron |
| 3,973,684 A | 8/1976 | Di Martino |
| 4,091,744 A | 5/1978 | Crissy et al. |
| 4,096,816 A | 6/1978 | Patterson, III |
| 4,400,856 A | 8/1983 | Tseung |
| 4,457,650 A | 7/1984 | Tseung |
| 4,645,392 A | 2/1987 | Takaguchi |
| 4,656,689 A * | 4/1987 | Dennis .................... F16L 5/027 16/2.2 |
| 4,877,361 A | 10/1989 | DeRosa et al. |

(Continued)

FOREIGN PATENT DOCUMENTS

| | | | |
|---|---|---|---|
| DE | 4339768 A1 * | 5/1995 | ............ B60P 7/0807 |
| WO | 2011090430 | 7/2011 | |

OTHER PUBLICATIONS

Pacific Marine & Industrial, Helicopter Tie Down Web Pages, Jun. 3, 2010.

*Primary Examiner* — Hilary L Gutman
(74) *Attorney, Agent, or Firm* — Schroeder Law PC

(57) ABSTRACT

A socket assembly is adapted for retrofit installation within the deck of a vessel. The socket assembly reduces/eliminates the risk of introducing induced stresses into the socket and/or deck during the retrofit installation welding process by providing a cup-shaped body with lashing fixture, a ring secured about the periphery of the body smaller than an opening in the deck, and a securement leg extending downward from the underside of the body with an engagement wall surface offset from a centerline of the body.

8 Claims, 4 Drawing Sheets

(56) References Cited

U.S. PATENT DOCUMENTS

| | | | |
|---|---|---|---|
| 5,823,588 A | 10/1998 | Morghen | |
| 6,422,795 B2 | 7/2002 | Holt et al. | |
| 7,258,516 B1 * | 8/2007 | Collins | B60P 7/0807 410/99 |
| 7,278,368 B2 * | 10/2007 | Fockler | B63B 21/00 114/218 |
| 7,534,021 B2 * | 5/2009 | Naik | B60R 19/50 296/117 |
| 8,197,166 B2 | 6/2012 | Stull et al. | |
| 8,360,385 B2 | 1/2013 | Burg et al. | |
| 8,505,868 B2 | 8/2013 | Silvio et al. | |
| 8,568,070 B2 | 10/2013 | Meszaros | |
| 8,814,125 B2 | 8/2014 | Silvio et al. | |
| 9,340,142 B1 | 5/2016 | Belkin et al. | |
| D761,086 S * | 7/2016 | Zeidler | D8/356 |
| 2006/0133907 A1 * | 6/2006 | Bullock | B60P 7/0807 410/107 |

\* cited by examiner

DETAIL A

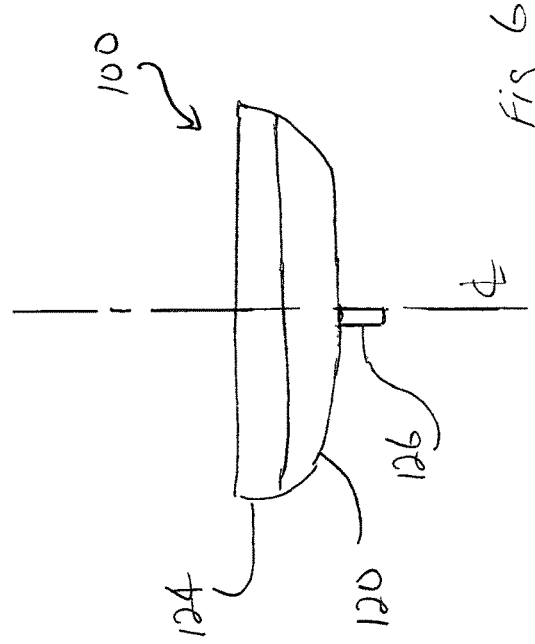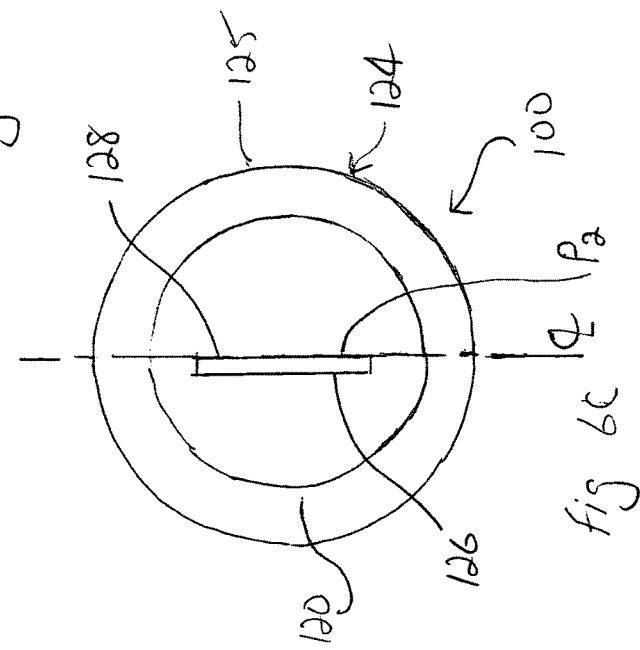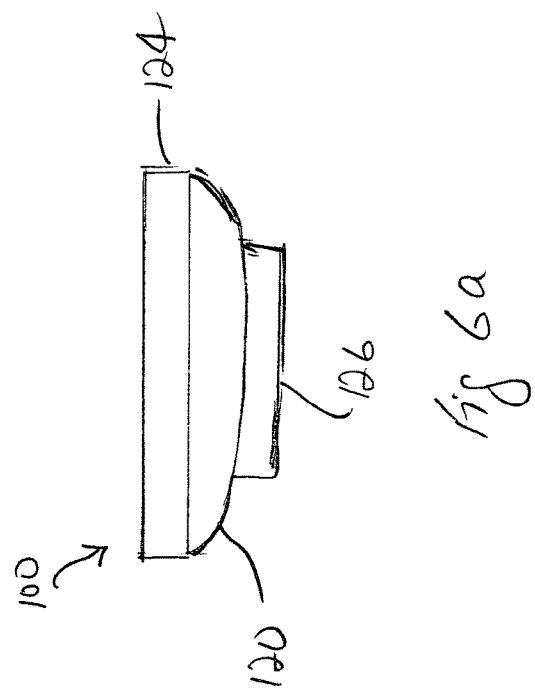

CARGO LASHING FITTING

BACKGROUND OF THE INVENTION

The present invention relates to maritime transportation of cargo and, more particularly, to a cargo lashing fitting adapted for retrofit installation within the deck of a transportation vehicle.

Transportation of cargo requires securing systems which include devices that ensure that such cargo remains safely stowed and stationary during transit. In this regard, the deck(s) of the transportation vehicles, e.g., ship, railcar, etc., typically include a plurality of cargo lashing fittings, often referred to as sockets.

The maritime transportation of cargo requires securing systems which include devices that can support and transfer the high loads experienced as a result of the ship's dynamics and environmental conditions. The mentioned sockets are also subjected to these high loads and environmental conditions. As a result, it is not unusual for deck sockets to experience wear and/or damage.

Prior art sockets are typically installed as an integrated unit. This means that if the socket is damaged and/or worn, the entire socket must be "cut" out of the deck of the ship. Although the removal of the old socket is itself an intricate procedure, the subsequent installation process of the new socket within the deck of the transportation vehicle is an even more intricate and complex procedure. In particular, the subsequent welding process must address deficiencies and defects about the periphery of the existing opening once the old socket has been removed. For example, excessive induced stresses can be introduced into the socket and/or deck if the outside diameter of the new socket does not smoothly interface with the reworked deck hole cutout. In addition, the underlying ship stiffener is typically reworked to engage the underside of the socket whereby the new socket can be welded to the ship stiffener. Any inconsistencies in the engagement between the underside of the new socket and the ship stiffener can result in the new socket being pulled toward the stiffener and away from the deck—which can also introduce induced stresses into the new socket and/or deck.

There is therefore a need in the art for a socket assembly which is adapted for retrofit installation within the deck of a vessel, as well as a method for such installation. There is a further need in the art for a socket assembly which reduces/eliminates the risk of introducing induced stresses into the socket and/or deck during the retrofit installation welding process.

SUMMARY OF THE INVENTION

The present invention, which addresses the needs of the prior art, relates to a socket assembly for installation in a deck of a transportation vessel, the deck including an opening therein defining a diameter $D_1$, the deck being supported by an underlying stiffener, the stiffener having a sidewall defining a plane $P_1$ The assembly includes a cup-shaped body, the body having a centerline extending therethrough. The assembly further includes a lashing fixture secured to the body. The assembly further includes a ring secured about the periphery of the body, the ring defining an outer diameter $D_2$, the diameter $D_2$ being less than diameter $D_1$. Finally, the securement leg extends downwardly from the underside of the body, the securement leg defining at least one engagement wall surface, the engagement wall surface being oriented substantially parallel to plane $P_1$ and being offset from the centerline such that the engagement wall surface is located for mating contact with the stiffener when the body is positioned within the opening in the deck.

The present invention further relates to a method for retrofit installation of a socket within the deck of a transportation vessel, the deck including an opening therein defining a diameter D, the deck being supported by an underlying stiffener. The method includes the steps of: a) reworking the opening to remove non-virgin material about the periphery thereof to provide a reworked cutout opening having a diameter $D_1$; b) positioning a socket assembly within the reworked cutout opening, the socket assembly including a cup-shaped body, a lashing fixture secured to the body, and a ring positioned about the periphery of the body, the ring defining an outer diameter $D_2$, the diameter $D_2$ being less than diameter $D_1$; c) welding the outer periphery of the ring to the deck; and d) providing a securement leg extending downwardly from the underside of the body, the securement leg defining at least one engagement wall surface, the securement leg being sized and located such that the engagement wall surface is positioned in mating contact with the stiffener.

As a result, the present invention provides a socket assembly which is adapted for retrofit installation within the deck of a vessel, as well as a method for such installation. The present invention further provides a socket assembly which reduces/eliminates the risk of introducing induced stresses into the socket and/or deck during the retrofit installation welding process.

BRIEF DESCRIPTION OF THE DRAWING

FIG. 1b is a bottom perspective view of the arrangement shown in FIG. 1a;

FIG. 6a is a front elevation view of the socket assembly of the present invention;

FIG. 6b is a side elevation view of the socket assembly of FIG. 6a; and

FIG. 6c is a bottom view of the socket assembly of FIG. 6b.

DETAILED DESCRIPTION OF THE INVENTION

Figure 1A:
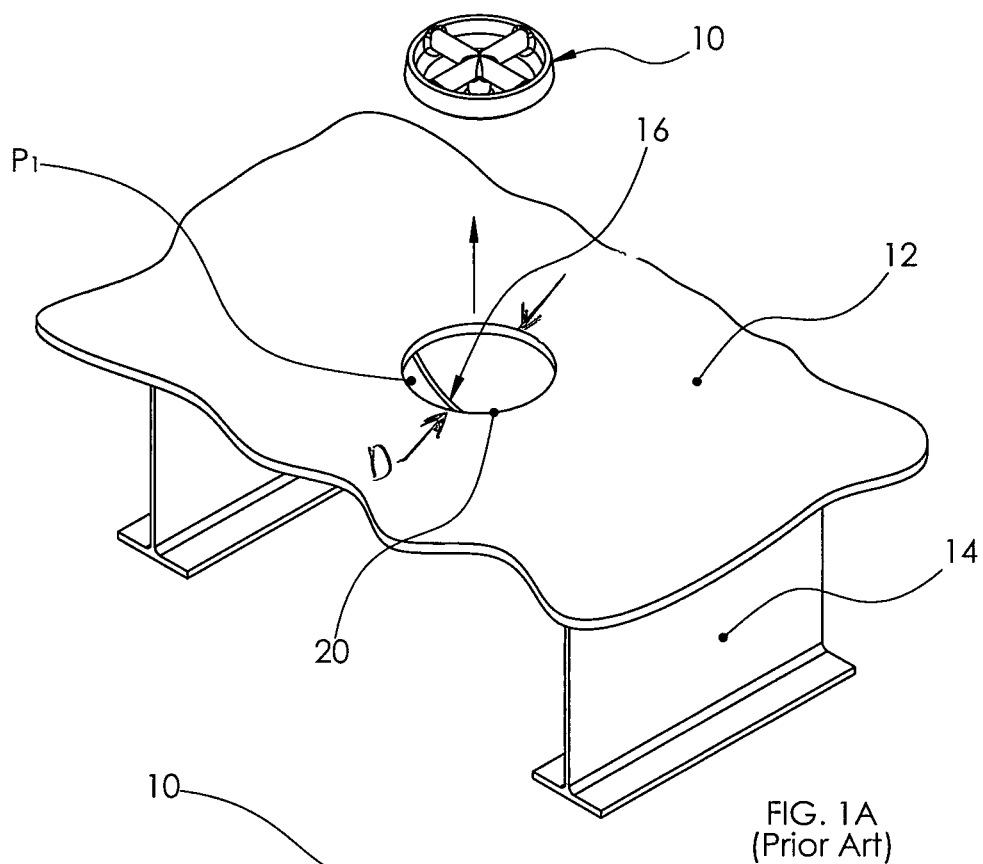
FIG. 1a is a top perspective view of a prior art socket removed from the deck of a transportation vessel.
Figure 1B:
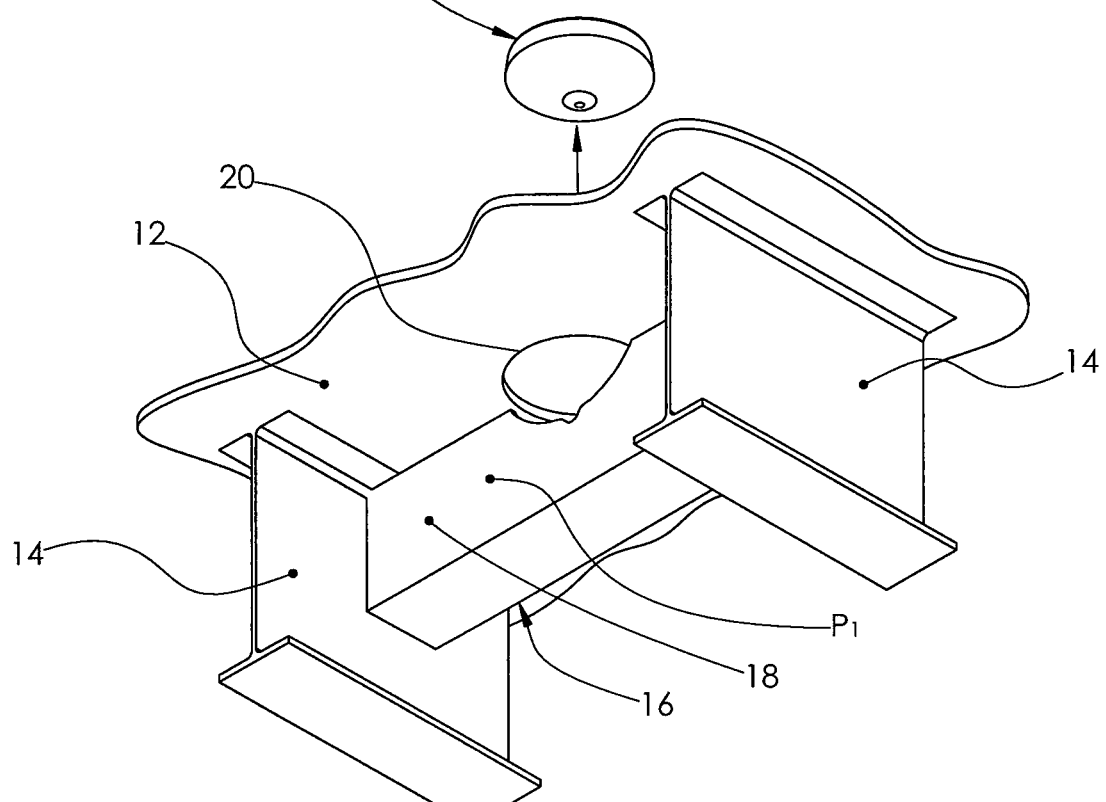
Figure 2:
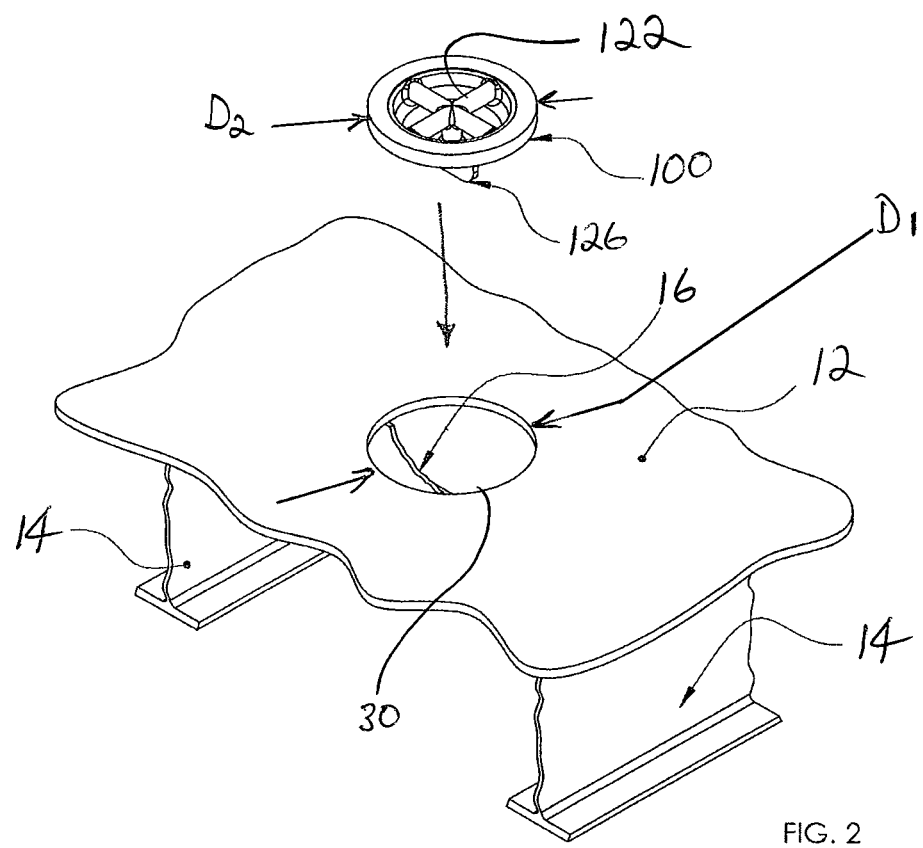
FIG. 2 is a top perspective view of a socket assembly according to the present invention positioned above a cutout opening in the deck of a transportation vessel.
Figure 3:
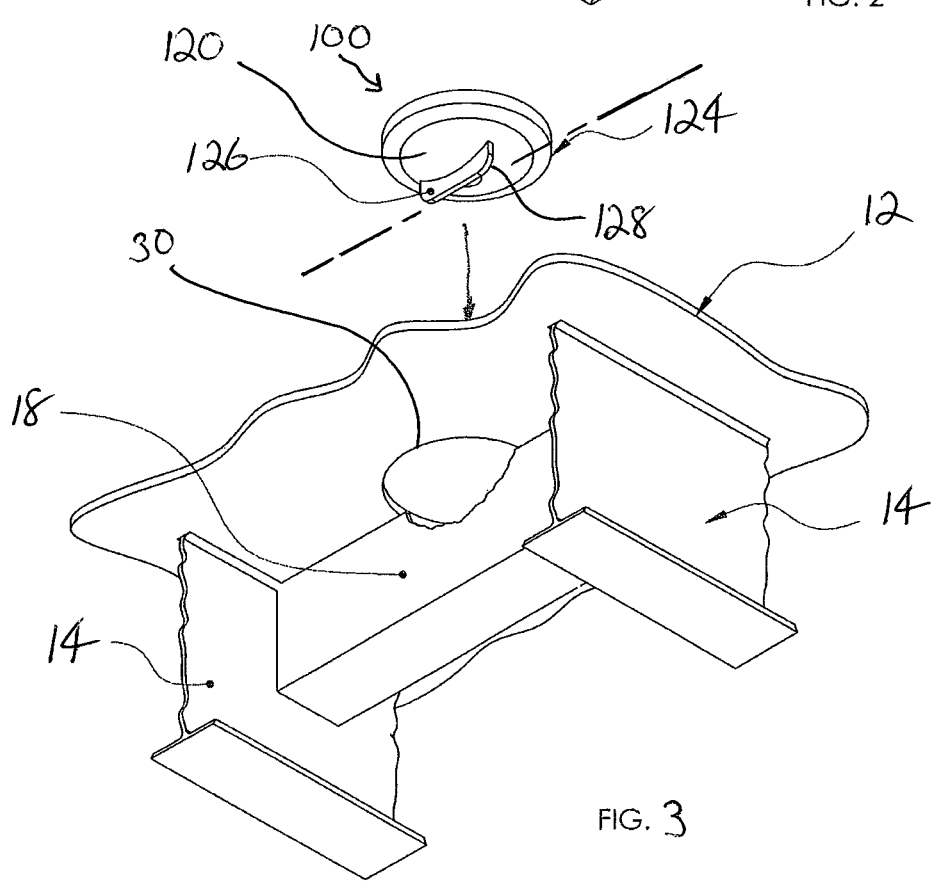
FIG. 3 is a bottom perspective view of the arrangement shown in FIG. 2.
Figure 4:
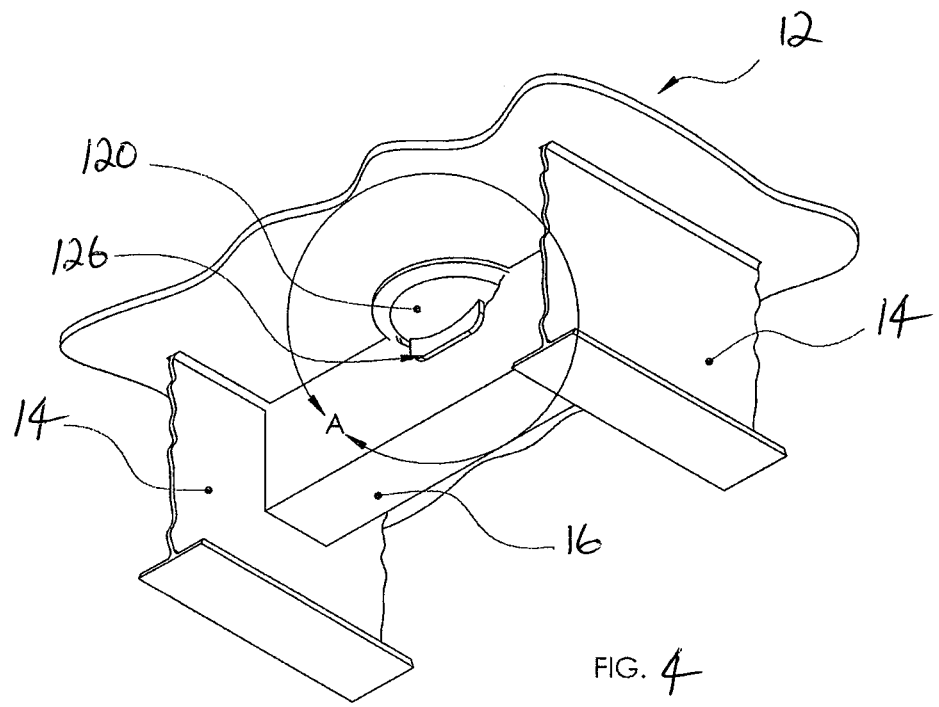
FIG. 4 is a bottom perspective view similar to FIG. 3 showing the socket assembly fitted within the cutout opening in the deck of the vessel.
Figure 5:
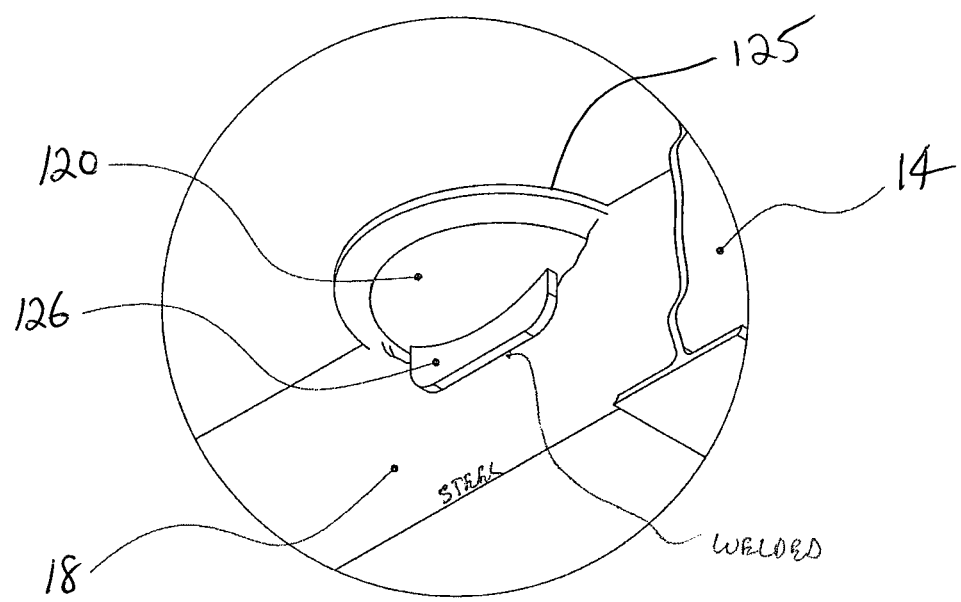
FIG. 5 is an enlarged detail taken from FIG. 4.

As discussed hereinabove, sockets are subject to wear and/or damage during use in the field. A worn/damaged socket must be removed from the deck of the vessel, typically via a flame-cutting procedure. Referring to FIGS. 1a to 1b, a prior art worn/damaged socket 10 is shown removed from a deck 12 of a transportation vehicle, e.g., a commercial ship, a military ship, etc. In many of such vehicles, deck 12 is supported by a plurality of beams 14 and stiffeners 16. Stiffener 16 includes a sidewall 18 defining a plane $P_1$. After the worn/damaged socket is removed from the deck 12, the original deck opening 20 having a diameter D is exposed.

Referring now to FIGS. 2 to 6c, the present invention provides a cargo lashing fitting, i.e., socket assembly 100, for installation within deck 12 of the vehicle. As explained further hereinbelow, socket assembly 100 is particularly suited for retrofit installation within the deck of the vehicle.

In one preferred embodiment, socket assembly 100 includes a cup-shaped body 120, a lashing fixture, i.e., cross-bar 122, secured to the interior walls of body 120, a ring 124 secured about the periphery of body 120, and a securement leg 126 extending from the underside of body 120. It is contemplated herein that the lashing fixture can have other configurations and/or forms, e.g., a cloverleaf configuration, a 5-bar configuration, etc.

After worn/damaged socket 10 is removed from the deck 12, the diameter of the original deck opening 20 is enlarged to provide a reworked opening 30 having a diameter $D_1$ slightly greater than the outer diameter $D_2$ of ring 124. It will be appreciated by those skilled in the art that increasing the diameter of the original deck opening 20 removes any post-weld, heat affected/fatigued material from the periphery of the opening. As a result, socket assembly 100 will be welded to new virgin material during installation, providing a stronger, more uniform welded connection. In one preferred embodiment, ring 124 has a thickness substantially equal to the thickness of deck 12.

Ring 124 is preferably formed of a material which is compatible with both body 120 and deck 12. Depending on the application, ring 124 may be formed of aluminum or steel, or another compatible material. In one preferred embodiment, ring 124 is welded to body 120 at the time of manufacture of socket assembly 100. This reduces the amount of welding necessary during the retrofit installation—which reduces the retrofit installation time and reduces any risk of negatively affecting the heat treatment of the socket assembly. In another embodiment, the ring is provided apart from the body, and the retrofit installation includes both the welding of the ring to the socket body and the welding of the ring to the deck. One advantage of such an embodiment is that the socket can be provided with multiple rings having different outer diameters—which would allow the installer to select the most appropriate-sized ring during the installation process. In a still further embodiment, ring 124 is formed from multiple materials and/or multiple rings such that the inner diameter of the ring is of a material compatible with welding to the socket body, e.g., steel, and the outer diameter of the ring is of a material compatible with welding to the deck of the transportation vehicle, e.g., aluminum. In yet another embodiment, ring 124 is integrally formed with body 120 and/or crossbar 122 via a casting, forging or other manufacturing process, thereby eliminating the need to weld the ring to the body and/or crossbar.

As also discussed hereinabove, the original socket is typically welded to the underlying stiffener. In the past, the worn/damaged socket would be removed, and the installer would then be faced with the difficulty of welding the underside of the new socket body to the underlying stiffener without causing the new socket to be drawn towards the stiffener (which introduces induced stresses into the socket/deck)—such welding being particularly difficult because the engagement between the bottom of the new socket and the stiffener is likely uneven and non-uniform. The socket assembly and method of the present invention address this retrofit installation issue by providing socket assembly 10 with a securement leg 126 extending downwardly from the underside of body 120 (best seen in FIG. 3).

Referring now to FIGS. 6b-6c, securement leg is attached to the underside of body 120 such that it is offset from centerline C extending through the center of body 120. Securement leg 126 preferably includes an engagement wall surface 128 oriented substantially parallel with plane $P_1$ and located for mating contact with sidewall 18 of stiffener 16 (best seen in FIG. 5). At this point, securement leg 126 can be readily and relatively easily welded to stiffener 16 without causing the socket body to be pulled toward the stiffener. In addition, the novel design of the present invention provides an increased area of surface contact between the socket assembly and the stiffener—which results in an increased welded surface area, and ultimately a stronger and more uniform welded connection. In another embodiment, securement leg 126 is secured to stiffener 16 via mechanical fasteners, such as bolts. In this case, securement leg 126 may be provided with pre-drilled apertures.

In another embodiment, the securement leg is provided apart from the body, and the retrofit installation includes both the welding of the securement leg to the socket body and the welding of the securement leg to the stiffener. One advantage of such an embodiment is that the socket can be provided with multiple securement legs having different thicknesses—which would allow the installer to select the most appropriate-sized securement leg during the installation process.

The installation of socket assembly 10 involves the step of removing the worn/damaged socket from the deck of the transportation vehicle, e.g., by flame-cutting. The removal of the old socket exposes the original deck opening 20 having diameter D. The exposed deck opening 20 is then reworked to remove any non-virgin material about the periphery of the opening thereby defining reworked cutout opening 30 having diameter $D_1$. This reworking may be accomplished by cutting an enlarged opening in the deck following removal of the old socket. Alternatively, the reworked cutout opening can be marked prior to removal of the old socket, and the removal of the old socket can be accomplished by cutting the enlarged opening in the deck—thus providing reworked opening 30 sized to receive socket assembly 100. Socket assembly 100 is then positioned within reworked cutout opening 30. Ring 124 is positioned about the periphery of body 120. Ring 124 defines an outer diameter $D_2$, which is less than or substantially equal to diameter $D_1$ defined by the reworked opening. The outer periphery 125 of ring 124 is welded to deck 12. The method includes the further step of providing securement leg 126 extending downwardly from the underside of body 120. Securement leg 126 defines at least one engagement wall surface 128, the securement leg 126 being sized and located such that engagement wall surface 128 is positioned in mating contact with sidewall 18 of stiffener 16.

In one preferred embodiment, ring 124 is welded to body 20 prior to installation of socket assembly 100 within reworked cutout opening 30. In another preferred embodiment, the securement leg is welded to the stiffener. In still another preferred embodiment, the securement leg is bolted to the stiffener. In a still further embodiment, the present method includes the step of welding securement leg 126 to the underside of body 120.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A cargo lashing fitting assembly for installation in a deck of a transportation vessel, said deck including an opening therein defining a diameter $D_1$, said deck being supported by an underlying stiffener, said stiffener having a sidewall defining a plane $P_1$, said assembly comprising:
    a cup-shaped body, said body having a centerline extending therethrough;
    a lashing fixture secured to said body,
    a ring secured about the periphery of said body, said ring defining an outer diameter $D_2$, said diameter $D_2$ being less than diameter $D_1$, and
    a securement leg extending downwardly from the underside of said body, said securement leg defining at least one engagement wall surface, said engagement wall surface being oriented substantially parallel to plane $P_1$ and being offset from said centerline such that said engagement wall surface is located for mating contact with said stiffener when said body is positioned within said opening in said deck.

2. The cargo lashing fitting according to claim 1, wherein said ring is formed of a material compatible for welding to said deck.

3. The cargo lashing fitting according to claim 2, wherein said ring is formed of aluminum.

4. The cargo lashing fitting according to claim 1, wherein said lashing fixture has a cross-bar configuration.

5. The cargo lashing fitting according to claim 1, wherein said lashing fixture has a cloverleaf configuration.

6. The cargo lashing fitting according to claim 1, wherein said body includes a substantially continuous concave interior wall, and wherein said lashing fixture is secured to said interior wall.

7. The cargo lashing fitting according to claim 1, wherein said ring and said securement leg are welded to said body.

8. The cargo lashing fitting according to claim 1, wherein said securement leg has a generally rectangular configuration and includes an arcuate upper end sized for mating contact with the underside of said body.

* * * * *